No. 669,535. Patented Mar. 12, 1901.
W. LUDOWICI.
RABBET TILE PRESS.
(Application filed Jan. 30, 1899.)

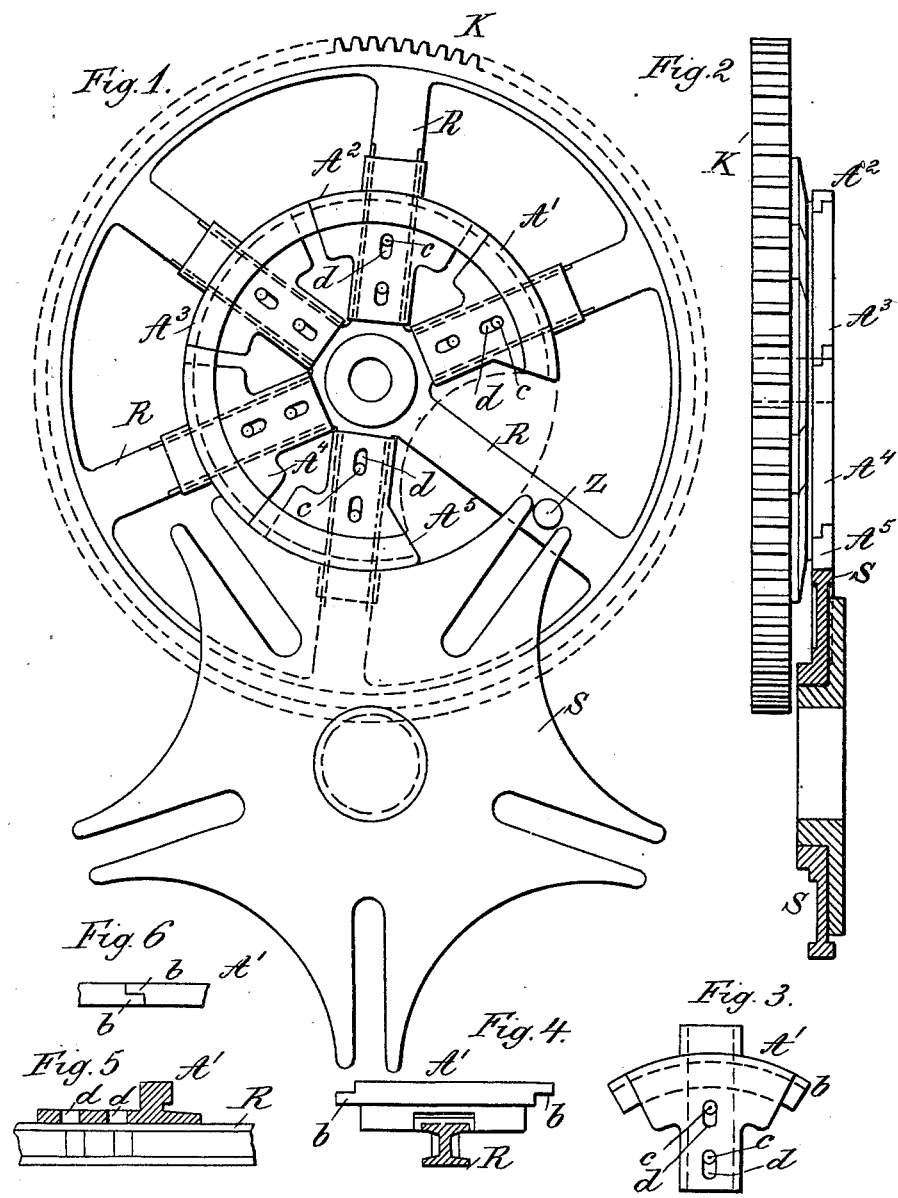

(No Model.) 2 Sheets—Sheet 2.

Witnesses
H. F. Bruns.
Chas Hogenson

Inventor
Wilhelm Ludowici
per Attorney
Heinrich Lade

THE NORRIS PETERS CO., PHOTO-LITHO., WASHINGTON, D. C.

UNITED STATES PATENT OFFICE.

WILHELM LUDOWICI, OF JOCKGRIM, GERMANY.

RABBET-TILE PRESS.

SPECIFICATION forming part of Letters Patent No. 669,535, dated March 12, 1901.

Application filed January 20, 1899. Serial No. 702,833. (No model.)

*To all whom it may concern:*

Be it known that I, WILHELM LUDOWICI, a citizen of the Kingdom of Bavaria, residing at Jockgrim, in the Kingdom of Bavaria, Germany, have invented a new and useful Improved Rabbet-Tile Press, of which the following is a specification.

This invention relates to rabbet-tile presses of the kind described in the United States Patent No.493,366, of March 14, 1893, in which prismatic blocks carrying the molds or dies are adjusted by means of a disk mounted on the shaft of one of the blocks and provided with circular recesses on its periphery and of corresponding segments fixed to the shafts of the other block, the shifting of the disk and its block being performed by a stud revolving with the segments and engaging with radial slots of the disk; and the object of my invention is to provide means for compensating for the wearing which necessarily takes place between the segments and the recessed disk. I attain this object by providing a plurality of separate segments corresponding to the number of faces of the prismatic blocks and by adjustably mounting the same on spokes of the wheel fixed to one of the blocks, as represented in the accompanying drawings, in which—

Figure 7:
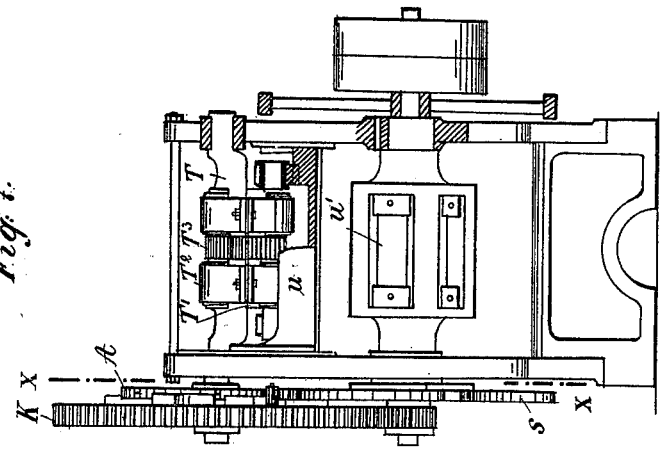
Figure 8:
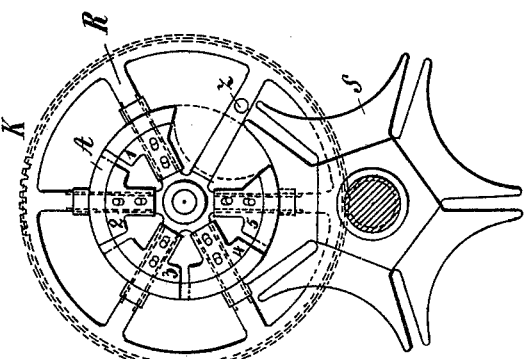

Figure 1 is a plan view of my invention, and Fig. 2 a corresponding side view, showing the recessed disk in section. Fig. 3 is a plan view of a detached segment, and Fig. 4 a top view thereof, the segment-carrying spoke being indicated in cross-section. Fig. 5 is a plan view of a spoke and a longitudinal sectional view of the segment fixed thereto. Fig. 6 shows in front view the connection between two adjacent segments. Fig. 7 is a side view of the rabbet-tile press with the new disk. Fig. 8 is a section through line $xx$ of Fig. 7.

T T', Figs. 7 and 8, are the eccentric shafts, by the rotation of which the stamp U is moved up and down in its guides. The shafts are held in their respective positions by the straps or frames $T^2$ and are in connection with each other through teeth $T^3$ cut in the same. The ridge-tile is pressed between stamp U and five-sided prism U', the top mold being fixed to the former and the bottom mold to the latter, which after each pressing operation is turned around one-fifth of a revolution or to the extent of one of its sides by means of star-wheel S, fixed on the same shaft and driven by pin Z of spur-wheel R, which upon the rotation of this latter engages in one of the slots of the star-wheel and carries it around until the pin becomes disengaged from the slot.

The die-press, which is provided with the new invention, is described and shown in Patent No. 493,366.

Referring to Fig. 1, there are five segments, $A^5$ $A'$ $A^2$ $A^3$ $A^4$, fixed, respectively, to the spokes of wheel R, corresponding to the number of faces of the die-blocks (which are supposed to be five in the present instance) and provided with lateral flanges $b$, overlapping each other, Figs. 4 and 6, so as to form a continuous circular edge extending throughout the larger portion of a circle. The segments are slotted at $d$ and fixed to the spokes by screw-bolts $c$. When releasing the latter, the segments can be shifted outward and then screwed again, thus compensating for wearing, the flanges $b$ always securing the connection between each two consecutive segments. One of the spokes of wheel R has been left without a segment and instead thereof provided with a stud $z$ to engage with the slots of disk S and to rotate the same by steps, so as to successively bring the several molds or dies into working position.

What I claim as my invention, and desire to secure by Letters Patent, is—

In a die-press for making rabbet-tiles the combination with a prismatic die-block of a spoke-wheel fixed to the die-block, and of a plurality of segments corresponding in number to the faces of the die-block and adjustably mounted on the spokes of the said wheel.

In testimony that I claim the foregoing as my invention I have signed my name in presence of two subscribing witnesses.

WILHELM LUDOWICI.

Witnesses:
HENRY GERBER,
JACOB ADRIAN.